Feb. 29, 1944.  A. O. WILLIAMS  2,342,992
BRAKE SUPPORT
Filed Aug. 13, 1942  2 Sheets-Sheet 1

INVENTOR.
Alfred O. Williams
BY Walter E. Schirmer
Atty.

Feb. 29, 1944.  A. O. WILLIAMS  2,342,992
BRAKE SUPPORT
Filed Aug. 13, 1942   2 Sheets-Sheet 2
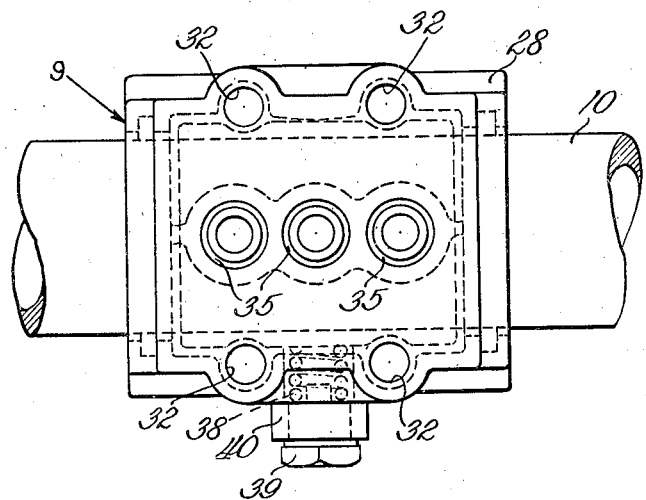
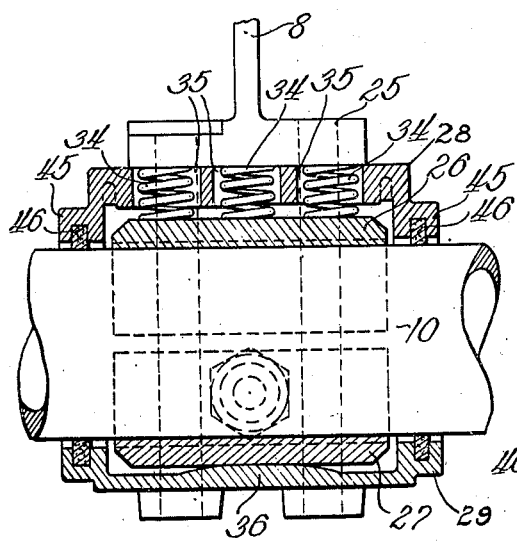
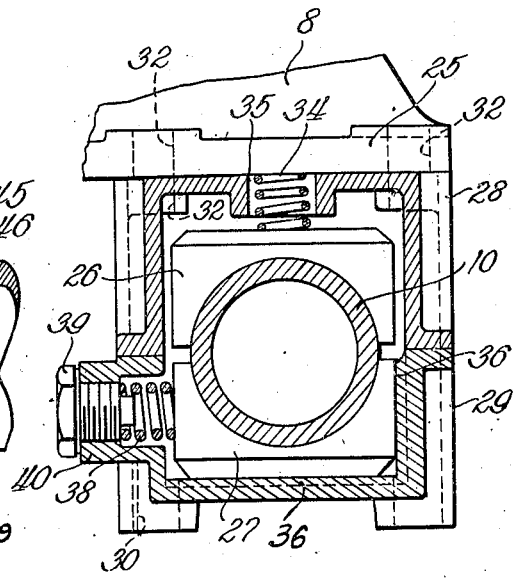
INVENTOR.
Alfred O. Williams
BY Walter E. Schirmer
Atty.

Patented Feb. 29, 1944

2,342,992

UNITED STATES PATENT OFFICE 2,342,992

BRAKE SUPPORT

Alfred O. Williams, Battle Creek, Mich., assignor to Clark Equipment Company, Buchanan, Mich., a corporation of Michigan Application August 13, 1942, Serial No. 454,745

8 Claims. (Cl. 308—72)

This invention relates to streetcar trucks, and is more particularly directed to the brake cross tube support for a streetcar or rail truck.

Such supports are employed for housing the brake cross tube and supporting it for rotation from the truck axle, the cross tube carrying at its ends suitable brake supporting heads carrying brake shoes adapted for engagement with the tread of the streetcar or rail wheels.

Such brake cross tube support boxes heretofore have been arranged with rubber bearing members or blocks for cushioning the tube for rotation therein. However, the present design has been developed in order to eliminate the use of rubber, but it has the distinct advantage of retaining all the features of cushioning and alinement heretofore provided by the rubber, and the actual bearing surface pieces are so arranged that they can adjust themselves in any direction to a proper bearing on the brake cross tube.

Another distinct advantage of the present invention is the provision of means within the brake cross tube support box for keeping all the elements against vibration or rattling, thereby eliminating any unnecessary noises in the operation of the streetcars. In this connection, the device is also completely self-adjusting, not only with respect to the fit of the bearing members on the cross tube, but also with respect to the taking-up of wear, both between the tube and the bearing elements and between these elements and the box.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 2 is an elevational view of the cross tube supporting box;

Figure 3 is a sectional view taken on a substantially horizontal plane, through the support box of the present invention; and Figure 4 is a corresponding sectional view taken at right angles to the axis of the tube through the support box.

Figure 1:
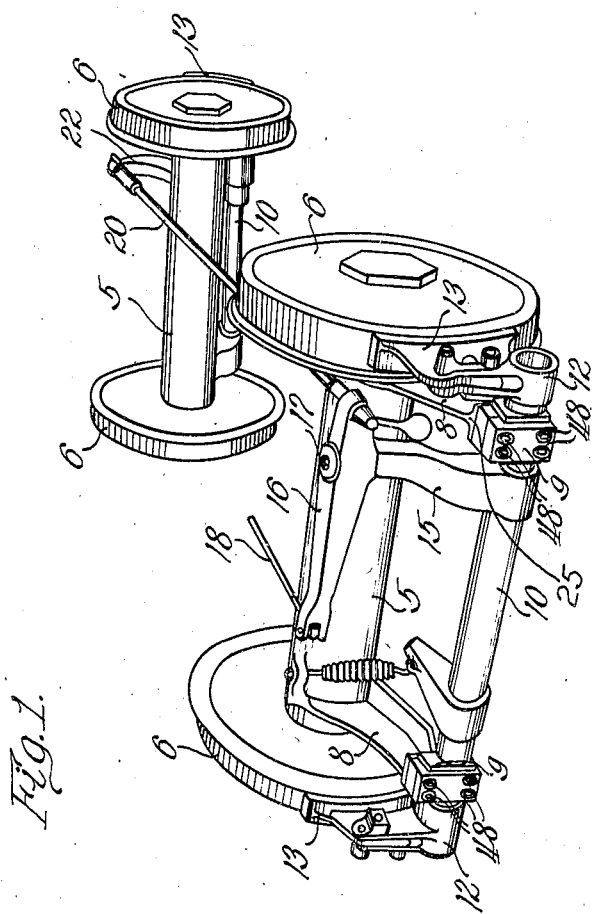
Figure 1 is a perspective view, partially diagrammatic, of a streetcar truck embodying the present invention.

Referring now in detail to the drawings, I have indicated a streetcar truck comprising two truck axle assemblies 5, carrying the wheels 6 at the outer ends thereof, these wheels being preferably of the type shown in the patent to Robert J. Burrows and myself, No. 2,167,633 of August 1, 1939. The housings are provided with normally extending support portions 8 which, at their ends, are adapted to receive support boxes or bearing means indicated generally at 9 for housing a brake cross tube 10. The cross tube 10 carries at its ends the brake supporting arms 12, which in turn have connected thereto the brakeshoes 13 adapted to engage the tread of the wheel 6. Mounted on the cross tube 10 adjacent one of the bearing supports 9 is a vertically extending arm 15, which, at its upper end, is provided with a transversely pivoted lever 16 mounted on the stud 17. The lever 16 at one end is connected through the motion transmitting member 19 to a brake operating mechanism. The opposite end of the arm 16 has connected thereto the motion transmitting rod 20 which extends longitudinally of the truck and is connected at its opposite end to an arm 22 carried by the opposite brake cross tube 10. The details of this brake operating mechanism are described in detail in the patent to Robert J. Burrows and myself, No. 2,221,074, of November 12, 1940, and require no detailed explanation here.

Considering now the details of the bearing support of the tube 10 in the support boxes 9, this is shown clearly in Figures 2 to 4, inclusive. In the illustrated embodiment of the invention, the rearwardly extending frame members 8 coming from the axle housing 5 have the vertically extending flanges 25 at their ends. The cross tube 10 is adapted to be supported within two complementary bearing blocks 26 and 27, which are provided with arcuate recesses extending about the external surface of the tube, the two blocks being carried within companion members 28 and 29 of a brake cross tube support box. The two members 28 and 29 are provided with flanged surfaces adapted to abut, and are supported in fixed position relative to the flange 25 of the frame member 8 by means of studs 48 which extend through suitable holes 30 and 32 formed in the box pieces 29 and 28, respectively, the studs threading into tapped openings 32 formed in the flanges 25 of the support members. Thus the studs draw the two box elements 28 and 29 tightly together and bolt them rigidly to the flange 25, thereby forming a rigid support for the box 9 on the flange.

In order to provide for self-adjustment and taking-up of wear within the support box, the blocks 26 which are carried within the box portion 28 are pressed firmly against the surface of the tube 10 by means of a plurality of springs 34, which springs are seated in suitable pockets 35 formed in the end face of the box portion 28, which is seated against the face of the flange 25. The springs 34 are therefore biased between the flange 25 and the block 26, holding the block firmly against the surface of the cross tube 10 and taking up any wear or adjustment required. The block 27 which engages over the opposite portion of the tube 10 is seated intermediate its ends against a boss 36 formed in the box portion 29, providing for rocking movement in a vertical plane. The boss 36 also extends vertically in the back face of the box portion 29 to provide limited rocking movement in a horizontal plane at right angles to the plane of rocking produced by the portion of boss 36 in the lower surface of box portion 29. The opposite side of the block 27 from that which engages the lower boss 36 is engaged by a suitably coiled spring 38 which is biased between the block and a stud screw 39 threading into a suitable boss 40 on the box 29. With this arrangement, the two block elements are spring applied against the tube 10, but are so arranged as to provide for adjustment thereof in any direction to a proper bearing for the brake cross tube. The springs perform the further function of compensating for any wear in the block elements, maintaining these elements tightly about the surface of the tube 10 so that no rattling or noise will be produced within this structure.

The combination of the rocking actions provided by support of the midportion of block 27 on boss 36 permits the two blocks to rock in angular misalignment with the box in both a vertical and a horizontal plane, thus accommodating any tube misalinement.

It is noted that at the ends of the box elements 28 and 29 suitable grooved flanges 45 are provided which carry suitable washer elements 46, embracing the surface of the tube 10 to maintain seals at the ends of the box where the tube enters and leaves the box.

It will also be noted that with this construction, the entire assembly may be readily disassembled by removal of the studs indicated at 48 in Figure 1, which bolt the entire assembly to the flanges 25 of the flange members 8. Removal of these studs allows for separation of the two box elements, thereby providing for inspection of the blocks and easy maintenance for servicing of the entire assembly.

It is therefore believed apparent that I have provided a novel type of brake cross tube support box which is economic in design and which has all the advantages of a rubber mounting with provision for compensation in wear and adjustment.

I do not intend to be limited to the specific features herein shown and described, but only insofar as defined by the scope and spirit of the appended claims.

I claim:

1. Means for supporting a brake cross tube in position parallel to a rail truck axle comprising rigid support boxes receiving said tube adjacent its ends, separated complementary bearing blocks in each of said boxes supporting said tube for rotation therein, spring means biasing one of said blocks downwardly into position about said support box, spring means biasing the other of said bushings laterally against said tube, and a boss on said box providing a universal support for said latter block on the opposite side thereof from said spring means.

2. Means for supporting a brake cross tube of a rail truck in position comprising rigidly mounted support boxes receiving said tube adjacent its ends, bearing blocks in said boxes supporting said tube for rotation therein, said blocks comprising arcuate mating elements embracing the external surface of said tube within each of said boxes, and separate spring means biasing one of said blocks downwardly into position on said tube and the other of said blocks laterally against said tube to prevent rattling and to take up wear.

3. Support means for the brake cross tube of a rail truck comprising a support box through which said tube extends, a semi-cylindrical bearing block in said box biased laterally against said tube, a second semi-cylindrical bearing block in said box resiliently held downwardly on said tube, and means for securing said box rigidly to said truck.

4. The support means of claim 3 further characterized in that said first block is biased against said tube by metal spring members.

5. Support means for a brake cross tube including support boxes through which said tube extends, complementary bearing blocks in each of said boxes, separate resilient means holding said blocks in engagement about said tube and acting at right angles to each other, and boss means in said boxes providing rocking action of one of said blocks in vertical and horizontal directions.

6. Support means for a brake cross tube comprising a rigid support through which said tube extends, independent complementary semi-cylindrical bearing blocks in said box, resilient means in the top of said box biasing one of said blocks downwardly onto said tube, and resilient means in the side of said box biasing the other block in a horizontal direction.

7. The support means of claim 6 further characterized in the provision of boss means in said box engaging said other block opposite said resilient means and providing a support for horizontal rocking movement thereof.

8. The support means of claim 6 wherein said box has boss means supporting said other block for rocking movement in both horizontal and vertical planes.

ALFRED O. WILLIAMS.